United States Patent [19]

Abeelen et al.

[11] Patent Number: 4,539,350

[45] Date of Patent: Sep. 3, 1985

[54] HIGH IMPACT, HIGH MODULUS FIBER REINFORCED LINEAR POLYESTER

[75] Inventors: Petrus C. A. M. V. Abeelen, Gilze; Jan Bussink, Bergen op Zoom; Jean M. H. Heuschen, Ha Halsteren, all of Netherlands

[73] Assignee: General Electric Company, Pittsfield, Mass.

[21] Appl. No.: 281,725

[22] Filed: Jul. 9, 1981

[51] Int. Cl.³ .............................................. C08K 3/40
[52] U.S. Cl. .................................... 523/527; 524/267
[58] Field of Search ................... 260/29.15 B, 40 R; 523/527; 524/267

[56] References Cited

U.S. PATENT DOCUMENTS

| 3,728,294 | 4/1973 | Levine | 260/29.15 B |
| 3,749,757 | 7/1973 | Marzocchi | 525/101 |
| 4,163,002 | 7/1979 | Pohl et al. | 260/40 R |
| 4,239,677 | 12/1980 | Dieck | 260/40 R |

Primary Examiner—Joseph L. Schofer
Assistant Examiner—N. Sarofim
Attorney, Agent, or Firm—Hedman, Gibson, Costigan & Hoare

[57] ABSTRACT

High impact, high modulus thermoplastic molding compositions comprising:
(a) a linear polyester;
(b) a fibrous reinforcing agent essentially free of any sizing agent; and
(c) a small amount of a polysiloxane having a substantial content of Si-H bonds.

5 Claims, No Drawings

HIGH IMPACT, HIGH MODULUS FIBER REINFORCED LINEAR POLYESTER

This invention is directed to an improved linear polyester composition in intimate admixture with an unsized fibrous reinforcing agent and a small amount of a hydrogen siloxane.

BACKGROUND OF THE INVENTION

Incorporating fibrous reinforcements, such as glass fibers and rockwool fibers, into various resins is known to improve dimensional stability, heat distortion temperature, creep resistance, tensile strength and, most dramatically, elastic modulus. However, this always results in a serious deterioration in overall ductility, manifested in poor notched and unnotched impact strength as well as a decreased falling ball impact strength. Even small amounts of fibrous reinforcements have a serious effect on the ductility of polyesters. If it is sought to improve impact performance by adding conventional impact modifiers, such as selectively hydrogenates styrene-butadienestyrene block copolymers, then there is a detrimental effect on stiffness (modulus) and only a minor improvement in impact strength, in any event. It has been found that elimination of the adhesive bond between the polyester and the fibrous reinforcing agent can be accomplished by burning off or otherwise using fibers free of conventional sizing or coupling agents. This does improve ductility, but only for relatively low fiber contents, e.g., up to less than about 10% by weight of sizing-free glass fibers in the polyesters. This is usually below the optimum amount.

It has now been discovered that the addition of poly $C_1$-$C_{10}$ alkyl (or phenyl) hydrogen siloxanes to compositions comprising "pristine" (or sizing-free) fibrous reinforcements and polyester, in which the fiber content exceeds even 30%, results in a tremendous improvement in falling ball (ductile) impact strength, and notched impact and unnotched impact strengths, too. These can be improved by several hundred percent with almost full retention of the elastic modulus.

It is believed that the following conditions are essential herein:

(i) sizing agents (on the fibrous reinforcement or separately added) must be absent because these either evoke adhesive bonds between the matrix and fiber, or they prevent reactions between the hydrogen polysiloxane and the fiber, or both;

(ii) a very good dispersion of the fibers in the matrix is required;

(iii) for best combination of high modulus and creep performance, the addition of polysiloxane is preferably kept below 1.0% and, especially preferably, below 0.5%; and (iv) the polysiloxane used must contain hydrogen silicon bonds.

Following the use, especially, of short glass fibers, additional advantages in improved isotropy and high surface quality are obtained. It is again reemphasized, that sizing agents must not be present to contribute to adhesive bonds between matrix and fibers, nor should they prevent reactions between the silicon-hyrdogen bond-containing polysiloxane and the fibers. In practical terms this means that pristine fibers should be used. Using the factors mentioned above, the falling dart impact strength of a 20% short glass fiber-reinforced polyesters can be increased from <5J to 80 J, while the unnotched impact bar increases from 350 to 950 J/m. The new composition has a desirable high modulus. These results are evident at surprisingly low levels of hydrogen polysiloxane. Substantially the same results are also obtained with other fibrous fillers, pristine or virgin, including rockwool-mineral fibers, carbon fibers, and the like.

SUMMARY OF THE INVENTION

According to the present invention, there are provided high impact strength, high modulus thermplastic compositions comprising per 100 parts by weight (a), (b) and (c), an intimate admixture of:

(a) from about 95 to about 35 parts by weight of a linear polyester polymer or copolymer;

(b) from about 5 to about 65 parts by weight of a fibrous reinforcing agent essentially free of any sizing agent; and (c) from about 0.05 to about 4 parts by weight of a hydrogen siloxane comprising units of the formula

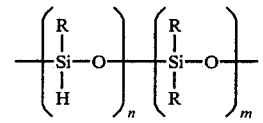

wherein R is hydrogen, $C_1$-$C_{10}$ alkyl, phenyl or a mixture of any of the foregoing, and n plus m is at least 4, and, for example, up to about 200.

DETAILED DESCRIPTION OF THE INVENTION

The linear polyesters (a) used in the practice of the present invention are polymeric glycol esters of terephthalic and isophthalic acids. They are available commercially or can be prepared by known techniques such as by the alcoholysis of esters of the phthalic acid with a glycol and subsequent polymerization, by heating glycols with the free acids or with halide derivatives thereof, and similar processes. These are described in U.S. Pat. Nos. 2,465,319 and 3,047,539.

Although the glycol portion of the polyester can contain from two to ten carbon atoms, it is preferred that it contain from two to four carbon atoms in the form of linear methylene chains.

Preferred polyesters will be of the family consisting of high molecular weight, polymeric glycol terephthalates or isophthalates having repeating units of the general formula:

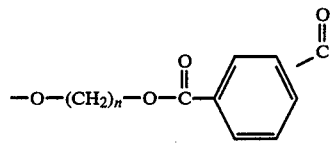

wherein n is a whole number from two to four, and mixtures of such esters, including copolyesters of terephthalic and isophthalic acids.

Especially preferred polyesters are poly(ethylene terephthalate) and poly(1,4-butylene terephthalate).

Conventional additives, such as anti-static agents, pigments, mold release agents, thermal stabilizers, and the like can be present in component (a).

The fibrous reinforcing agent (b) can vary widely in nature and type, so long as it is "pristine", that is, essentially free of any sizing materials, as mentioned above. There can be used glass fibers, mineral fibers, such as rockwool, asbestos, and the like, carbon fibers, and others. Preferred are glass fibers and rockwool fibers.

The length of the filaments, whether or not they have been bundled to form fibers, should be between about 50 mm and 6 mm, for long fibers and between about 6 mm and 0.05 mm in the case of short fibers. Alkali-free aluminum-boron-silicate glass ("E" glass) or alkali containing glass ("C" glass) can be used, as well as others. Preferred is a ground short flass fiber.

Any of the hydrogen polysiloxanes known in the art can serve as component (c). Especially useful are those set forth by formula in U.S. Pat. No. 3,971,756. The patent also cites U.S. Pat. Nos. 2,445,794; 2,448,756; 2,484,595 and 3,514,424 as showing ways of making such siloxanes. To save unnecessarily detailed description, these are all incorporated herein by reference. Most important members of the family are those in which R is methyl, or phenyl, or a mixture thereof. These are commercially available. At the present time, it is preferred to use poly(methyl hydrogen)siloxane, a fluid which is available commercially from General Electric Company under the trade designation DF-1040.

In some embodiments it is contemplated to use a small amount, e.g., up to 10 parts by weight per 100 parts by weight of (a), (b) and (c) combined, of an impact modifier. This can compromise a polyacrylate, or a copolymer of a diene and acrylonitrile and/or vinyl aromatic compound. A preferred such modifier is a block copolymer, of the linear or radial type, comprising diene rubber center blocks and vinyl aromatic terminal blocks. Illustrative dienes are butadiene or isoprene, and illustrative vinyl aromatics are styrene, vinyl toluene, and the like. Especially suitable are selectively hydrogenated such compounds. Particularly valuable are the selectively hydrogenated linear ABA types, made from styrene (A) and butadiene (B), and sold by Shell Chemical under the trade-name Kraton G, and the corresponding radial teleblocks sold by Phillips Chemical under the tradename Solprene.

Any conventional method can be used to formulate the present thermoplastic compositions, and to mold them. The important factor is to insure intimate admixture. The amount of components (a), (b) and (c) and, optionally (d) to be used have been broadly set forth above. Preferably, however, the siloxane will be present in an amount of from about 0.05 to less than 0.5, and especially preferably, about 0.4 parts, by weight per 100 parts by weight of (a), (b) and (c) combined. Especially preferably the fibrous reinforcing agent will be present in an amount of from about 15 to about 40 parts by weight per 100 parts by weight of (a), (b) and (c) combined. Mixing temperatures and molding temperature will be illustrated in the following examples, but, in any event, will be entirely in harmony with those well known to those skilled in the art of polyester resin technology.

DESCRIPTION OF THE PREFERRED EMBODIMENTS

The following example illustrates the compositions of the present invention. It is not to be construed to limit the claims in any manner whatsoever.

EXAMPLE 1

A polyester composition was prepared by extruding poly(ethylene terephthalate), short milled glass fibers essentially free of any sizing agent and, where indicated, a polymethyl hydrogen siloxane (DF 1040, General Electric Company). Extrusion is carried out at 265° C. and the extrudate is comminuted into pellets.

The pellets are then injection molded at about 300° C. (cylinder) into standard physical test specimens, so that heat distortion temperature (HDT) can be measured according to standard test methods; Izod impact strength, notched and unnotched can be measured on $\frac{1}{8}''$ bars according to standard test methods; elastic modulus and tensile yield strength and elongation at yield and at break can be measured according to standard test methods.

The compositions used, and the properties observed are set forth in Table 1:

TABLE 1

Short Fiber Reinforced Polyester Compositions

| Compositions (parts by weight) | Example A | Example B |
|---|---|---|
| Poly(ethylene terephthalate) | 80 | 80 |
| Poly(methyl hydrogen siloxane)[a] | — | 0.5 |
| Short unsized glass fibers[b] | 20 | 20 |
| Properties | | |
| Melt vixcosity, 300° C. Pa-s | 310 | 390 |
| Heat Distortion Temperature, °C. | 75 | 75 |
| Tensile Modulus, N/mm$^2$ | 4200 | 3910 |
| Tensile Strength, N, mm$^2$ | 69.5 | 60.5 |
| Elongation at break, % | 3.5 | 14 |
| Time to failure in gasoline at 1% strain | No failure in 20 hours | |
| Whitening in gasoline | No | No |
| Izod impact: | | |
| notched, J/m | 35 | 65 |
| unnotched, J/m | 350 | 950 |
| Falling dart impact, J 10 Kg; h = var; ⌀ 10 cm disc; w = 3.2 mm ⌀ 9.5 cm ring support | <5 | 80 |

[a]DF 1040, General Electric Company
[b]EC 10W, Gevetex Co.

Obviously many variations are possible in light of the above detailed description. For example, the poly(ethylene terephthalate) can be substituted with poly(1,4-butylene terephthalate). The poly(methylhydrogen)siloxane can be substituted with a poly(phenylhydrogen)siloxane. Instead of short glass fibers, unsized long glass fibers can be substituted. An impact improving amount, e.g., 5% by weight of a selectively hydrogenated block copolymer of styrene-butadiene-styrene, e.g., Shell's Kraton G, can be included in the composition. All such obvious variations are within the full intended scope of the appended claims.

What is claimed is:

1. A high impact strength, high modulus thermoplastic composition comprising, per 100 parts by weight (a), (b) and (c), an intimate admixture of:
    (a) from about 35 to about 95 parts by weight of a linear polyester;
    (b) from about 5 to about 65 parts by weight of a fibrous reinforcing agent essentially free of any sizing agent said fibrous reinforcing agent being selected from the group consisting of glass fibers or rockwool fibers; and
    (c) from about 0.05 to about 4 parts by weight of a hydrogen siloxane comprising units of the formula

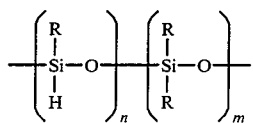

wherein R is hydrogen, $C_1$–$C_{10}$ alkyl phenyl, or a mixture of any of the foregoing, and n plus m is at least about 4.

2. The composition of claim 1 wherein the siloxane is present in an amount of from about 0.05 to less than about 0.5 parts by weight per 100 parts by weight of (a), (b) and (c) combined.

3. The composition of claim 1 wherein the siloxane is present in an amount of about 0.4 parts by weight per 100 parts by weight of (a), (b) and (c) combined.

4. The composition of claim 1 wherein the linear polyester is poly(ethylene terephthalate).

5. The composition of claim 1 wherein the linear polyester is poly(1,4-butylene terephthalate).

* * * * *